US012524630B2

United States Patent
Clinchant et al.

(10) Patent No.: US 12,524,630 B2
(45) Date of Patent: Jan. 13, 2026

(54) ADVERSARIAL GENERATION METHOD FOR TRAINING A NEURAL MODEL

(71) Applicant: NAVER CORPORATION, Seongnam-si (KR)

(72) Inventors: Stéphane Clinchant, Meylan (FR); Badr Youbi Idrissi, Gagnac sur Garonne (FR)

(73) Assignee: NAVER CORPORATION, Seongnam-si (KR)

( * ) Notice: Subject to any disclaimer, the term of this patent is extended or adjusted under 35 U.S.C. 154(b) by 811 days.

(21) Appl. No.: 17/463,084

(22) Filed: Aug. 31, 2021

(65) Prior Publication Data

US 2023/0084333 A1 Mar. 16, 2023

(51) Int. Cl.
*G06F 40/58* (2020.01)

(52) U.S. Cl.
CPC ................... *G06F 40/58* (2020.01)

(58) Field of Classification Search
CPC ...... G06N 3/084; G06N 3/045; G06N 3/0455; G06N 3/047; G06N 3/0475; G06N 3/09; G06N 3/094; H01L 23/3677; H01L 23/4006; H01L 23/42; H01L 23/473; H01L 23/4735; H05K 7/20236; H05K 7/20254; H05K 7/20263; H05K 7/20272; H05K 7/2039; H05K 7/20772; H05K 7/20781; H05K 7/20927; G06F 40/42; G06F 40/58
See application file for complete search history.

(56) References Cited

U.S. PATENT DOCUMENTS

| | | | |
|---|---|---|---|
| 10,452,978 B2 | 10/2019 | Shazeer et al. | |
| 2020/0097554 A1* | 3/2020 | Rezagholizadeh | ...... G06N 3/08 |
| 2020/0210772 A1* | 7/2020 | Bojar | .................. G06F 18/2148 |
| 2021/0241099 A1* | 8/2021 | Li | .......................... G06N 3/088 |

OTHER PUBLICATIONS

Alzantot, M., et al., "Generating Natural Language Adversarial Examples," Proceedings of the 2018 Conference on Empirical Methods in Natural Language Processing, Brussels, Belgium, Association for Computational Linguistics, Oct. 31-Nov. 4, 2018, pp. 2890-2896.

Bahdanau, D., et al., "Neural Machine Translation by Jointly Learning to Align and Translate," 3rd International Conference on Learning Representations, ICLR 2015—Conference Track Proceedings and 2015, published on arXiv: as 1409.0473v6, Apr. 24, 2015, 15 pages.

(Continued)

*Primary Examiner* — Angela A Armstrong
(74) *Attorney, Agent, or Firm* — Greer, Burns & Crain, Ltd

(57) ABSTRACT

Methods and systems for training a neural language model. Clean sequence pairs are received including clean source and target sequences. For each clean sequence pair, a noisy version is sampled with an adversarial generator to generate a noisy sequence pair. Parameters of the neural language model are optimized on the clean and noisy sequence pairs. Parameters of the adversarial generator are optimized to minimize a modeling loss of the adversarial generator and maximize a neural language loss of the neural language model using backpropagation.

31 Claims, 6 Drawing Sheets

(56) References Cited

OTHER PUBLICATIONS

Belinkov, Y., et al., "Synthetic and Natural Noise both Break Neural Machine Translation," International Conference on Learning Representations 2018, published on Arxiv.org as 1711.02173, Feb. 24, 2018, 13 pages.

Carlni, N., et al., "On Evaluating Adversarial Robustness," published in Arxiv.org as 1902.06705v2, Feb. 20, 2019, 24 pages.

Cheng, M., et al., "Seq2Sick: Evaluating the Robustness of Sequence-to-Sequence Models with Adversarial Examples," Proceedings of the AAAI Conference on Artificial Intelligence, vol. 34, 2020, pp. 3601-3608.

Cheng, Y., et al., "Robust Neural Machine Translation with Doubly Adversarial Inputs," ACL 2019—57th Annual Meeting of the Association for Computational Linguistics, Proceedings of the Conference, Florence Italy, Jul. 28-Aug. 2, 2019, pp. 4324-4333.

Cheng, Y., et al., "AdvAug: Robust Adversarial Augmentation for Neural Machine Translation," Proceedings of the 58th Annual Meeting of the Association for Computational Linguistics, Online, Association for Computational Linguistics, 2020, pp. 5961-5970.

Cheng, Y., et al., "Towards Robust Neural Machine Translation," Proceedings of the 56th Annual Meeting of the Association for Computational Linguistics (vol. 1: Long Papers), Melbourne, Australia, Jul. 15-20, 2018, pp. 1756-1766.

Clark, K., et al., "Electra: Pre-Training Text Encoders as Discriminators Rather Than Generators," International Conference on Learning Representations, 2020, 18 pages.

Clinchant, S., et al., "On the Use of Bert for Neural Machine Translation," Proceedings of the 3rd Workshop on Neural Generation and Translation, Hong Kong, Association for Computational Linguistics, Nov. 4, 2019, pp. 108-117.

Ebrahimi, J., et al., "On Adversarial Examples for Character-Level Neural Machine Translation," Proceedings of the 27th International Conference on Computational Linguistics, Santa Fe, New Mexico, USA, Association for Computational Linguistics, Aug. 20-26, 2018, pp. 653-663.

Ebrahimi, J., et al., "HotFlip: White-Box Adversarial Examples for Text Classification," Proceedings of the 56th Annual Meeting of the Association for Computational Linguistics (vol. 2: Short Papers), Melbourne, Australia, Association for Computational Linguistics, Jul. 5-20, 2018, pp. 31-36.

Goodfellow, I., et al., "Explaining and Harnessing Adversarial Examples," 3rd International Conference on Learning Representations, ICLR 2015—Conference Track Proceedings. International Conference on Learning Representations, ICLR, published on ArXiv.org as 1412.6572, Mar. 20, 2015, 11 pages.

Hochreiter, S., et al., "Long Short-Term Memory," Neural Computation, 9(8), 1997, pp. 1735-1780.

Jang, E., et al., "Categorical Reparameterization with Gumbel-Softmax," ICLR 2017, published on ArXiv.org as 1611.01144, Nov. 22, 2016, 12 pages.

Karpukhin, V., et al., "Training on Synthetic Noise Improves Robustness to Natural Noise in Machine Translation," Proceedings of 2019 EMNLP Workshop W-NUT: the 5th Workshop on Noisy User-Generated Text, Hong Kong, China, Association for Computational Linguistics, Nov. 4, 2019, pp. 42-47.

Koehn, P., et al., "Six Challenges for Neural Machine Translation," Proceedings of the First Workshop on Neural Machine Translation, Association for Computational Linguistics (ACL), Vancouver, Canada, Aug. 4, 2017, pp. 28-39.

Lample, G., et al., "Cross-Lingual Language Model Pretraining," published on Arxiv.org as 1901.07291, Jan. 22, 2019. 10 pages.

Li, J., et al., "Understanding Neural Networks through Representation Erasure," published on arXiv.org as 1612.08220, Jan. 10, 2017, 18 pages.

Maddison, C., et al., "The Concrete Distribution: A Continuous Relaxation of Discrete Random Variables," 5th International Conference on Learning Representations, ICLR 2017, published on Arxiv.org as 1611.00712, Mar. 5, 2017, 20 pages.

Madry, A., et al., "Towards Deep Learning Models Resistant to Adversarial Attacks," published on ArXiv.org as 1706.06083, Sep. 4, 2019, 23 pages.

Michel, P., et al., "On Evaluation of Adversarial Perturbations for Sequence-to-Sequence Models," Proceedings of the 2019 Conference of the North American Chapter of the Association for Computational Linguistics: Human Language Technologies, vol. 1 (Long and Short Papers), Minneapolis, Minnesota, Association for Computational Linguistics, Jun. 2-7, 2019, pp. 3103-3114.

Miyato, T., et al., "Adversarial Training Methods for Semi-Supervised Text Classification," published on ArXiv.org as 1605.077257 Nov. 7, 2016, 10 pages.

Miyato, T., et al., "Virtual Adversarial Training: A Regularization Method for Supervised and Semi-Supervised Learning," IEEE Transactions on Pattern Analysis and Machine Intelligence 41, No. 8, Aug. 2019, pp. 1979-1993.

Müller, M., et al., "Domain Robustness in Neural Machine Translation," published on Arxiv.org as 1911.03109, Nov. 8, 2019, 11 pages.

Niu, X., et al., "Evaluating Robustness to Input Perturbations for Neural Machine Translation," Proceedings of the 58th Annual Meeting of the Association for Computational Linguistics, Online, Association for Computational Linguistics, Jul. 5-10, 2020, pp. 8538-8544.

Ott, M., et al., FairSEQ: A Fast, Extensible Toolkit for Sequence Modeling Proceedings of the 2019 Conference of the North, Minneapolis, Minnesota, Association for Computational Linguistics, Jun. 2-7, 2019, pp. 48-53.

Papernot, N., et al., "Crafting Adversarial Input Sequences for Recurrent Neural Networks," MILCOM 2016—2016 IEEE Military Communications Conference, Baltimore, MD, USA: IEEE, 2016, pp. 49-54.

Post, M., "A Call for Clarity in Reporting Bleu Scores," Proceedings of the Third Conference on Machine Translation: Research Papers, Belgium, Brussels, Association for Computational Linguistics, Oct. 31-Nov. 1, 2018, pp. 186-191.

Ranzato, M., et al., "Sequence Level Training with Recurrent Neural Networks," ICLR 2016, San Juan, Puerto Rico, Conference Track Proceedings, published on ArXiv.org as 1511.06732, May 6, 2016, 16 pages.

Rawlinson, G., "The Significance of Letter Position in Word Recognition," IEEE Aerospace and Electronic Systems Magazine, 22(1), 2007, pp. 26-27.

Sato, M., et al., "Effective Adversarial Regularization for Neural Machine Translation," Proceedings of the 57th Annual Meeting of the Association for Computational Linguistics, Florence, Italy, Association for Computational Linguistics, Jul. 28-Aug. 2, 2019, pp. 204-210.

Shafahi, A., et al., "Adversarial Training for Free!," 33rd Conference on Neural Information Processing Systems (NeurIPS 2019), Vancouver, Canada, 2019, 12 pages.

Shen, S., et al., "Minimum Risk Training for Neural Machine Translation," Proceedings of the 54th Annual Meeting of the Association for Computational Linguistics (vol. 1: Long Papers), Berlin, Germany. Association for Computational Linguistics, Aug. 7-12, 2019, pp. 1683-1692.

Szegedy, C., et al., "Intriguing Properties of Neural Networks," 2nd International Conference on Learning Representations, ICLR 2014, published on ArXiv.org as 1312.6199, Feb. 19, 2014, 10 pages.

Tramèr, F., et al., "Ensemble Adversarial Training: Attacks and Defenses," International Conference on Learning Representations, 2018, 20 pages.

Tsipras, D., et al., "Robustness May Be at Odds With Accuracy," International Conference on Learning Representations (ICLR), 2019, 23 pages.

Vaswani, A., et al., "Attention Is All You Need," Advances in Neural Information Processing Systems 30, NIPS 2017, Long Beach CA USA, 2017, pp. 5998-6008.

Wang, C., et al., "On Exposure Bias, Hallucination and Domain Shift in Neural Machine Translation," Proceedings of the 58th Annual Meeting of the Association for Computational Linguistics, Association for Computational Linguistics, Jul. 5-10, 2020, pp. 3544-3552.

(56) References Cited

OTHER PUBLICATIONS

Wong, E., et al., "Fast is Better Than Free: Revisiting Adversarial Training," International Conference on Learning Representations (ICLR), 2020, 17 pages.

Wu, L., et al., "Beyond Error Propagation in Neural Machine Translation: Characteristics of Language Also Matter," Proceedings of the 2018 Conference on Empirical Methods in Natural Language Processing, Brussels, Belgium. Association for Computational, Oct. 31-Nov. 4, 2018, pp. 3602-3611.

Yin, P., et al., "Understanding Straight-Through Estimator in Training Activation Quantized Neural Nets," Published on arXiv 1903.05662v4, on Sep. 25, 2019, 30 pages.

Zhang, D., et al., "You Only Propagate Once: Accelerating Adversarial Training via Maximal Principle," 33rd Conference on Neural Information Processing Systems (NeurIPS 2019), Vancouver, Canada, 2019, 12 pages.

Zhang, H., et al., "Theoretically Principled Trade-off between Robustness and Accuracy," Proceedings of the 36th International Conference on Machine Learning, PMLR 97, 2019, pp. 7472-7482.

Zou, W., et al., "A Reinforced Generation of Adversarial Samples for Neural Machine Translation," published on Arxiv.org as 1911.03677, Nov. 9, 2019, 8 pages.

Devlin, J., et al., Bert: Pre-Training of Deep Bidirectional Transformers for Language Understanding, Proceedings of the 2019 Conference of the North American Chapter of the Association for Computational Linguistics: Human Language Technologies, vol. 1, Minneapolis, Minnesota, Jun. 2-7, 2019, pp. 4171-4186.

\* cited by examiner

ADVERSARIAL GENERATION METHOD FOR TRAINING A NEURAL MODEL

FIELD

The present disclosure relates generally to machine learning, and more particularly to methods and systems for training neural models such as neural machine translation (NMT) models.

BACKGROUND

Use of attention mechanisms for neural networks has significantly improved the performance of neural machine translation (NMT) models in the art, allowing such models to surpass earlier, statistical approaches to machine translation. Methods such as those disclosed in Vaswani et al., Attention is all you need, in Advances in Neural Information Processing Systems 30, pages 5998-6008, 2017, and in U.S. Pat. No. 10,452,978 have improved performance of NMT models.

Neural networks have shown impressive performance on several benchmarks, even surpassing human baselines. However, they still behave very strangely on some inputs. For instance, known NMTs have been shown to be sensitive to input noises such as but not limited to typographical errors (typos), rare characters, or words, which can affect the overall translation quality. Known NMTs are also prone to produce hallucinations.

Szegedy et al., Intriguing properties of neural networks, in $2^{nd}$ International Conference on Learning Representations, ICLR 2014—Conference Track Proceedings, 2014, discloses that deep neural networks are prone to adversarial attacks. For instance, by carefully changing a few pixels in an image, a classifier decision could be made arbitrary.

Robustness has become increasingly significant in machine learning. By maximizing the classification error of a neural network, one can find imperceptible perturbations that completely change the output of the model. These inputs are referred to in the art as adversarial examples. The existence of these inputs and many others show that neural networks currently are very brittle and sensitive to slight changes in the input.

Such adversarial examples have given rise to the field of adversarial attack. Adversarial attacks rely on a gradient computed at a data sample x to calculate changes in data that would diminish a probability of true classification.

Recent adversarial training for NMT models attempts to improve robustness by adopting gradient base attacks to substitute words with others and maximally perturb the model. However, such adversarial training can be time- and resource-intensive, at least in part due to the need to generate suitable training sets. There continues therefore to exist a need for improved adversarial training methods that address these inefficiencies.

SUMMARY

Provided herein, among other things, are methods and systems for training a neural language model. In an example training method, a plurality of clean sequence pairs are received, each clean sequence pair including a clean source sequence and a clean target sequence. For each clean sequence pair, a noisy version is sampled with an adversarial generator to generate a noisy sequence pair. The adversarial generator is differentiable. Parameters of the neural language model are optimized on the clean sequence pairs and on the noisy sequence pairs. Parameters of the adversarial generator are optimized to minimize a modeling loss of the adversarial generator and maximize a neural language loss of the neural language model using backpropagation.

In some embodiments, parameters are further optimized on the neural language model using a discriminator objective of a discriminator configured to distinguish between clean and substituted tokens in the noisy sequence pairs.

Other embodiments provide, among other things, a system for training a machine translation model, the system can be implemented by a processor and a memory. The system comprises a machine translation model and a multilingual language model generator. The multilingual language model generator is trained to generate token substitutions in clean sentence pairs of source and target sentences in a machine translation batch to provide noisy sentence pairs. The multilingual language model generator is differentiable.

In some embodiments the tokens comprise words and/or subwords, and the token substitutions comprise insertions and deletions. The token substitutions can be linguistically plausible based on a first objective and detrimental to the machine translation model based on a second objective.

The multilingual language model generator can be configured to:
for each clean sentence pair, sample a noisy version with the multilingual language model generator;
optimize machine translation parameters both on the clean sentence pairs and on their noisy version; and
optimize parameters of the multilingual language model generator using backpropagation to minimize the language modeling loss based on the first objective and maximize the machine translation loss based on the second objective.

In some embodiments the system further comprises a discriminator. The discriminator can be configured for distinguishing between clean and substituted tokens in the noisy sequence pairs.

The machine translation parameters may be further optimized on a discriminator objective of the discriminator.

According to a complementary aspect, the present disclosure provides a computer program product, comprising code instructions to execute a method according to the previously described aspects; and a computer-readable medium, on which is stored a computer program product comprising code instructions for executing a method according to the previously described embodiments and aspects. The present disclosure further provides a processor configured using code instructions for executing a method according to the previously described embodiments and aspects.

Other features and advantages of the invention will be apparent from the following specification taken in conjunction with the following drawings.

DESCRIPTION OF THE DRAWINGS

The accompanying drawings are incorporated into the specification for the purpose of explaining the principles of the embodiments. The drawings are not to be construed as limiting the invention to only the illustrated and described embodiments or to how they can be made and used. Further features and advantages will become apparent from the following and, more particularly, from the description of the embodiments as illustrated in the accompanying drawings, wherein.

In the drawings, reference numbers may be reused to identify similar and/or identical elements.

DETAILED DESCRIPTION

Methods herein directly train a generator for generating noisy or perturbed samples (adversarial examples), referred to herein as an adversarial generator. The adversarial generator is directly trained with the NMT model, as opposed to, for instance, being first (separately) trained to generate adversarial examples (e.g., while the NMT model is fixed) and then used in a fixed state to train the NMT model.

In example methods, the NMT model can be trained based on a machine translation loss, which may be augmented by an adversarial loss calculated using adversarial examples generated by the adversarial generator. The adversarial generator can be concurrently trained (e.g., in the same forward and backward passes) based on the adversarial loss and a generator loss, which may be weighted using an offset. The adversarial generator can thus be trained with both the objectives of minimizing the modeling loss of the adversarial generator and maximizing the neural language loss. Example adversarial generators generate adversarial examples by masking one or more input tokens in received sequences, e.g., of training data, to directly learn the adversarial generator.

Example methods can improve robustness for NLP models such as NMT models, while avoiding additional search costs (e.g., costs of randomly selecting words and searching for meaning-preserving replacements, which is computationally expensive). Prior methods, on the other hand, rely on fixed, static adversarial generators for NMT training. Example methods have been shown in experiments to significantly improve speed (e.g., 2×, 3×, or more) over some prior methods for computing and for improving robustness.

For purposes of explanation, examples and specific details are set forth in order to provide a thorough understanding of the embodiments. Embodiments, as defined by the claims, may include some or all of the features in these examples alone or in combination with the other features described below, and may further include modifications and the equivalence of the features and concepts described herein. The following description will refer to FIGS. 1-6, explaining embodiments and technical advantages in detail.

Figure 1:
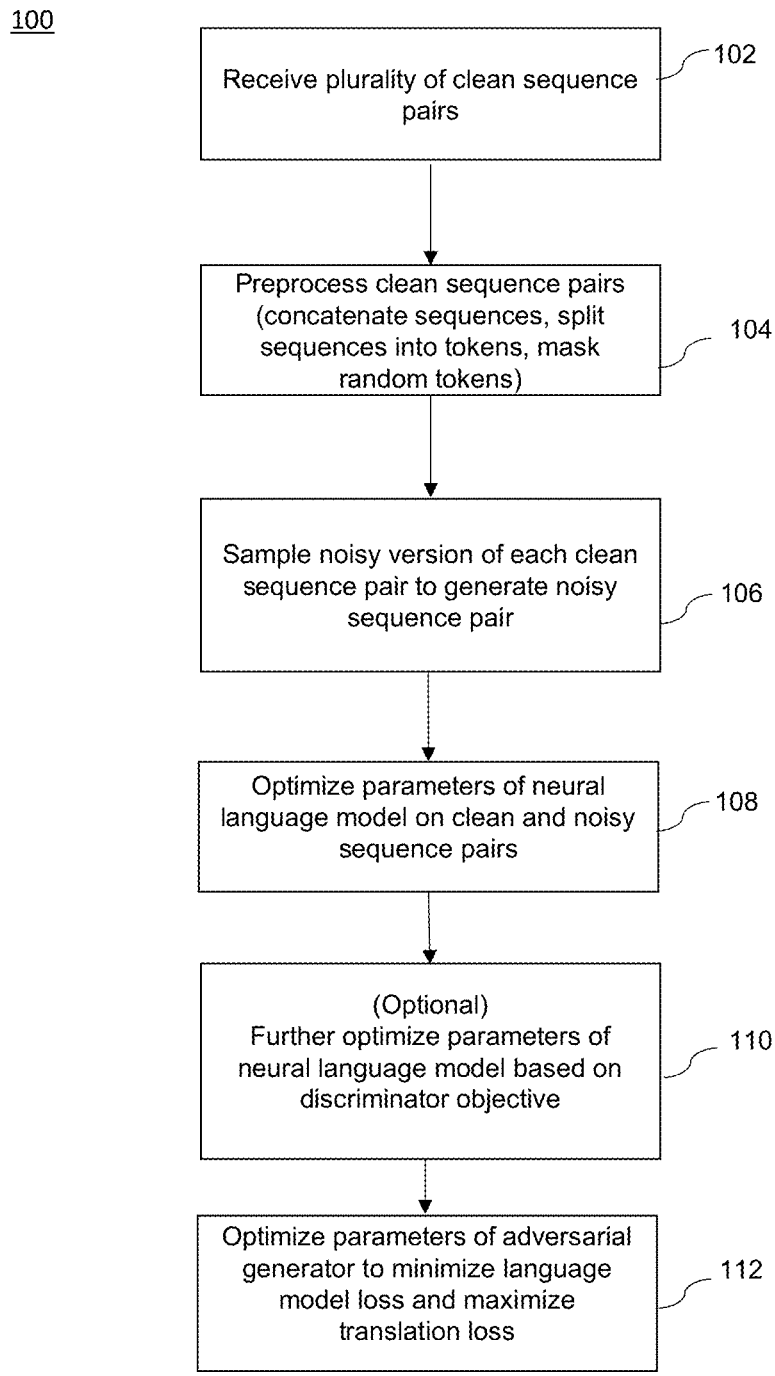
FIG. 1 shows an example method for training a neural language model according to example embodiments.
Figure 2:
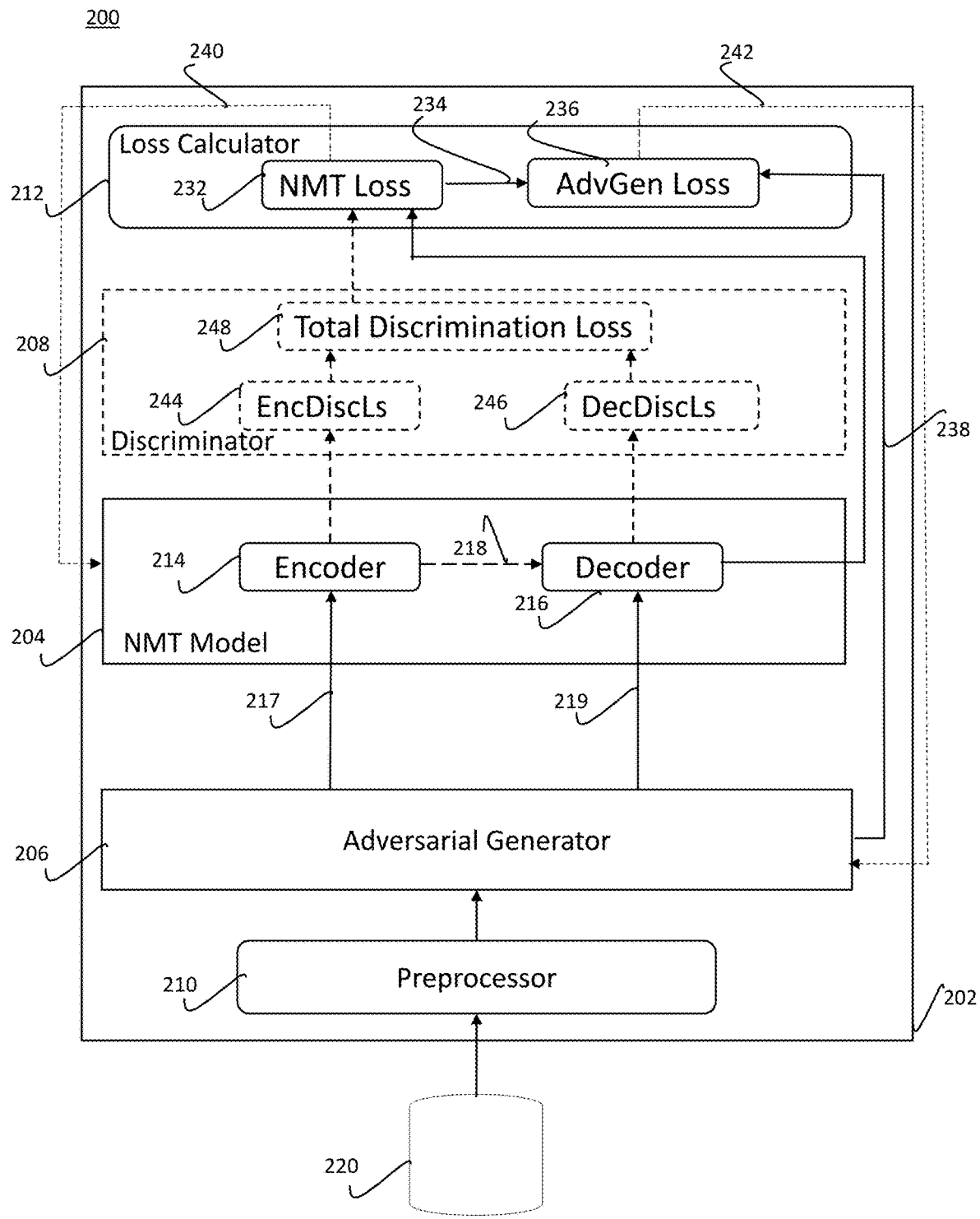
FIG. 2 shows an example architecture for performing the method in FIG. 1.

FIG. 1 illustrates an example method 100 for training a neural model, which in example embodiments described herein is an autoregressive encoder-decoder model, examples of which include a neural language model such as a neural machine translation (NMT) model. FIG. 2 shows an example architecture 200 for carrying out the method 100. An example NMT is a bilingual translation model.

The architecture 200 can be implemented, for instance, in a processor 202 executing suitable instructions stored in a memory. The architecture 200 generally includes the neural language model, e.g., NMT 204, to be trained, an adversarial generator 206 for generating noisified (perturbed) sequences for robustness training of the NMT, and, optionally, a discriminator 208. A preprocessor 210, which may be integrated into the adversarial generator 206 or be embodied separately from the adversarial generator, may be provided for preprocessing input sequences according to example methods. A loss calculator 212, which may be integrated into the NMT 204 or be embodied separately from the NMT, may be provided for calculating losses and gradients for updating parameters of the NMT and the adversarial generator 206. When the NMT 204 is not being trained, e.g., when used for inference at runtime, the loss calculator 212 (and the discriminator 208, if provided for training) can be omitted.

The example NMT 204 is an encoder-decoder model such as but not limited to an attention-based model, e.g., a self-attention model such as a transformer model. Additional information regarding the transformer model can be found in U.S. Pat. No. 10,452,978, which is incorporated herein in its entirety. The NMT 204 includes an encoder 214 and a decoder 216. The encoder 214 is configured to accept an input sequence of tokens 217 such as but not limited to an input sentence and generate a dense vector representation 218 of the input sequence. The decoder 216 is configured to accept the dense vector representation 218 and generate an output sequence of tokens such as but not limited to an output sentence based on the dense vector representation using methods that will be understood by those of ordinary skill in the art.

During example training methods for the NMT 204, e.g., using teacher forcing, the input sentence 217 to the encoder 214 can be a source sentence. The decoder 216 can be configured to additionally accept a target sequence 219 such as a target sentence, and to generate the output sentence based on the dense vector representation 218 and the target sentence.

Referring again to FIG. 1, in the example method 100, a plurality of clean sequence pairs is received at 102. For example, the processor 202 may receive the clean sentence pairs from a batch stored locally to the processor or remotely, such as via a network. The batch may be stored in any suitable storage, such as but not limited to a database 220 in communication with the processor 202. An example batch is provided by a dataset, including (for training machine translation models) available machine translation training datasets known to those of ordinary skill in the art. The batch can include a (clean) parallel corpus having a (clean) source side and (clean) target side.

Each clean sequence pair includes a clean source sequence (e.g., of tokens such as words or subwords), such as a clean source sentence, and a clean target sequence (e.g., of tokens such as words or subwords), such as a clean target sentence. By "clean" it is intended that the sequence has not yet been perturbed (that is, noisified), at least during a current pass through the example architecture 200. It is possible, however, that the sequence has been altered prior to a current pass through the example architecture 200 but is considered "clean" with respect to the current pass. For a bilingual machine translation model, for instance, each clean sequence pair may be embodied in a clean source sentence pair including a clean source sentence in a first language and a clean target sentence in a second language.

Example tokens for sentence pairs include words and/or subwords. In example embodiments, the clean sentence pairs are preprocessed at 104. For instance, the preprocessor 210 may split the clean sentence pairs into tokens, e.g., common tokens, including words and/or subwords.

Further, the preprocessor 210 may randomly mask (e.g., drop) one or more of the tokens in the clean source sentence, in the clean target sentence, or in both the source and target sentences. As will be explained further herein, the adversarial generator 206 can be trained to generate adversarial examples including perturbing the source and target sequences by generating token substitutions for the masked tokens that are linguistically plausible according to a language model objective, and that are detrimental to the machine translation model according to an adversarial objective. Example methods herein that generate adversarial examples by masking tokens and generating token substitutions are referred to as "masked adversarial generation" models or "MAG" models.

During the preprocessing 104, the preprocessor 210 may concatenate the clean source and target sequence in the clean sentence pair, either prior to or following the masking. This concatenation may occur, for instance, so that the adversarial generator 206 can be configured to consider an overall context of the source and target sequences.

The adversarial generator 206 is trained using example methods to generate token substitutions in the clean sequence pairs to provide noisy sequence pairs; that is, sequence pairs in which one or both of the source sequence or target sequence are perturbed by the substitution of one or more tokens. As used herein, "noisifying" a sequence refers to introducing perturbations in the sequence. If a source and a target sequence are provided from source and target sides, respectively, of a parallel corpus, noisifying the parallel corpus includes noisifying at least one (one or both) of the source and target side including one or more sequences therein.

For each clean sequence pair, the adversarial generator 206 samples a noisy version to generate a noisy sequence pair at 106. For example, the adversarial generator 206 may sample one or more token perturbations (e.g., replacements, substitutions, insertions, deletions) in the clean source sequence, the clean target sequence, or both, to replace the masked tokens in such sequences. If the clean source and target sequences are concatenated, the adversarial generator 206 may sample the one or more perturbations in the concatenated sequence pair. An objective of this sampling can be to preserve a meaning of the masked token, while another, competing objective of this sampling can be to maximize loss (e.g., translation loss) in the neural language model 204.

In example embodiments, the adversarial generator 206 is differentiable, for instance to allow for backpropagation to optimize parameters of the model provided by the adversarial generator. For instance, the adversarial model 206 can include a differentiable model using a continuous probability distribution that approximates categorical samples. An example differential model is a reparameterization model, such as the Gumbel-SoftMax reparameterization model.

An output of the adversarial generator 206 from step 106 can include a noisy sequence pair provided for the input sequence 217 to the encoder 214 and the input sequence 219 to the decoder 216. The noisy sequence pair can include a source sequence and a target sequence in which at least one is noisy (includes one or more perturbations). Thus, the noisy sequence pair can include: a noisy source sequence and noisy target sequence; a noisy source sequence and clean target sequence; or a clean source sequence and noisy target sequence. Additionally (e.g., separately or concurrently), the clean sequence pair is provided for the input sequence 217 to the encoder 214 and the input sequence 219 to the decoder 216.

Parameters of the neural language model 204 are optimized on the clean sequence pair(s) and on the noisy sequence pair(s) at 108. This improves robustness of the neural language model 204, e.g., to token substitutions. If the clean sequence pair is taken from a clean parallel corpus, for instance, the neural language model 204 can be trained on the clean corpus including the clean sequence pairs and the noisified parallel corpus including the noisy sequence pairs. A loss, e.g., as calculated using the loss calculator 212, can include a combination of the loss for the clean sequence pair (referred to as a standard translation loss) and for the noisy sequence pairs (referred to as an adversarial loss), which may be, but need not be, weighted.

For instance, for the noisy sequence pair, the source and target sequences of the noisy sequence pair (at least one being noisy), can be input (fed) as inputs 217, 219 to the encoder 214 and the decoder 216, respectively. If the clean source and target sequences are concatenated during the preprocessing 204, the noisy sequence pair may then be split into the source and target sequences. Similarly, for the clean sequence pair, the clean source and target sequences are input (fed) as inputs 217, 219 to the encoder 214 and the decoder 216, respectively.

During the optimization 108, the encoder 214 can generate a dense vector representation 218 based on the input noisy source sequences (e.g., sentences) 217 according to encoder parameters of the neural language model 204. Similarly, the encoder 214 can generate a dense vector representation 218 based on input clean source sequences (sentences) 217 from the clean sentence pair according to the encoder parameters of the neural language model 204. The dense vector representation 218 is input (fed) to the decoder 216.

The decoder 216 receives the dense vector representation 218 and, during training, e.g., where teacher forcing is used, receives the target sequence (e.g., sentence) 219 from the noisy sequence pair. Based on the dense vector representation and the target sequence from the noisy sequence pair, the decoder 218 outputs a predicted sequence according to the decoder parameters of the neural language model 204. For example, the decoder 218 can model a conditional probability of output tokens. The decoder 218 also receives the clean target sequence (e.g., sentence) 219 from the clean sentence pair and outputs a predicted sequence according to the decoder parameters of the neural language model 204.

The predicted sequences from the decoder 218 are processed by the loss calculator 212. The loss calculator 212 determines (e.g., calculates) a neural language model loss, e.g., translation loss, 234 for the NMT model 204, for noisy sentence pairs (adversarial loss) and for clean sentence pairs (standard translation loss) at neural language model loss calculation block 232. This calculated loss 234 from block 232 can be used in part to optimize parameters of the neural language model 204, for instance by calculating a gradient for the neural language model (e.g., to minimize loss) and backpropagating 240 the gradient through the neural language model to optimize the model parameters (e.g., of encoder 214 and decoder 216).

Additionally, to train the adversarial generator 206, parameters of the adversarial generator are optimized at 112 with objectives of minimizing a modeling loss of the adversarial generator and maximizing the neural language model loss. An objective of minimizing the generator modeling loss (a language model objective) can allow the trained adversarial generator 206 to generate token substitutions for (e.g., masked) tokens in a sequence such as those in the clean sentence pair that are linguistically plausible (e.g., preserving meaning in the masked token). An objective of maximizing the neural language model loss (an adversarial objective) can allow the trained adversarial generator 206 to generate token substitutions that are detrimental to the machine translation model.

For instance, the loss calculator 212 in the example architecture 200 can further include an adversarial generator loss (AdvGen Loss) calculation block 236, which can receive a calculated adversarial loss 234 for the noisy sentence pair(s) from the language model loss calculation block 232 (or from a separate language loss calculation source). This calculated translation loss provides an adversarial loss for the adversarial generator 206 for the (adversarial) objective of maximizing the neural language model loss. Additionally, the adversarial generator loss calculation block 236 can receive an output 238 from the adversarial generator 206 and calculate a language modeling loss for the objective of minimizing a generator modeling loss. The adversarial generator loss calculation block 236 may employ an offset for weighting one or both of the language modeling loss or the adversarial loss.

The combined loss calculated by the adversarial generator loss calculation block 236 can then be used to optimize parameters of the adversarial generator 206. For instance, the combined loss can be used to determine, e.g., calculate, a gradient that is used to optimize the parameters through backpropagation 242. This is aided by the adversarial generator 206 being differentiable in example methods.

As opposed to prior neural language training methods, the example method 100 can directly train (learn) an adversarial generator such as adversarial generator 206. For instance, as opposed to using gradient information from training an adversarial generator to select substitute tokens a posteriori, and then training a neural language model to improve robustness using the substituted tokens, the example method 100 can train the adversarial generator 206 generally concurrently with the neural language model, e.g., optimizing parameters for both the neural language model and the adversarial generator in the same forward and backward passes. Further, the direct training of the adversarial generator 206 in example methods is enhanced by considering the results from the robustness training of the neural language model. This can result in significantly enhanced training speeds compared to known adversarial training methods while obtaining comparable or even improved results.

Optionally, the parameters of the neural language model 204 can be further optimized at 110 using the discriminator 208. The example discriminator 208 is configured based on a discriminator objective of distinguishing between tokens in the clean sequence pairs token substitutions. For instance, the discriminator 208 may be configured to detect tokens that have been replaced by calculating a discrimination loss. This discrimination loss can be incorporated into (e.g., combined with) the neural language model loss at the neural language model loss calculation block 232 to provide a combined loss. The combined loss can then be processed by the loss calculation block 232 to determine the gradient for the neural language model 204 that is backpropagated through the neural language model.

In the example architecture 200, the discriminator 208 is provided at a head or end 244 of the encoder 214 to receive the noisy source sequences from the encoder and calculate an encoder discrimination loss (EncDiscLs) and at a head or end 246 of the decoder 216 to receive the generated (e.g., predicted) output from the decoder and calculate a discrimination loss. The outputs from the encoder and decoder ends 244, 246 may be combined in discriminator calculation block 248 for calculating a combined discrimination loss, or may be fed directly to the neural language model loss calculation block 232 for combining the outputs, in which case the discriminator calculation block 248 may be omitted. As another example, the discriminator 208 may be provided at the end of the encoder 214 or the decoder 216 (e.g., end 244 or end 246), and the discriminator calculation block 248 may be omitted.

In embodiments where the discriminator 208 is provided, the language model (e.g., translation) loss, for both the clean sentence pair and the noisy sentence pair, as well as the discrimination loss, can be considered in the calculation of the loss and gradient used to optimize the parameters of the neural language model 204. On the other hand, if the discriminator 208 is omitted, the language model loss can be used to optimize the neural language model 204 parameters.

Example Training Method

Neural language models trained using example methods can include, for instance, end-to-end neural machine translation (NMT) models, which generally include an encoder (e.g., encoder 214) and a decoder (e.g., decoder 216). For illustrating features of example methods and systems, an example method for adversarial training of an NMT will be formally stated. However, it will be appreciated that similar or analogous features can be used for training other neural language or neural sequence-based models, such as but not limited to autoregressive encoder-decoder models.

An example NMT model can be based on a Transformer architecture, e.g., as disclosed in Vaswani et al., Attention is all you need, in Advances in Neural Information Processing Systems 30, pages 5998-6008, 2017, and in U.S. Pat. No. 10,452,978. The Transformer architecture is an attention mechanism that can process tokens (e.g., words or subwords) in an input sequence concurrently to learn contextual relations between the tokens.

In an example Transformer architecture, the encoder $f_\theta$ is a parametric function that takes as input a source token sequence such as a source sentence $(x_1, \ldots, x_n)$ and outputs a dense vector representation Y. The decoder $g_\theta$ is a parametric function that models the conditional probability of the output tokens:

$$p_\theta(y_i|Y,y_{i-1}, \ldots ,y_1) = g_\theta(Y,y_{i-1}, \ldots ,y_1) = g_\theta(f_\theta(x_1, \ldots ,x_n),y_{i-1}, \ldots ,y_1)$$

Training the example NMT model includes maximizing the smoothed (e.g., via label smoothing) log-likelihood of the sentence pairs in a training corpus. Therefore, a cross-entropy loss can be used:

$$\mathcal{L}_{mt} = \Sigma_{x \in S, y \in T} \Sigma_{i \in [1,n]} -\log p_\theta(y_i|Y,y_1, \ldots y_{i-1}) \quad (1)$$

Example neural language models such as NMT models can be trained using teacher forcing. In teacher forcing, the previous target words from the reference sentence are fed to the decoder at every step during training. However, as will be appreciated by those of ordinary skill in the art, during inference, the model generates the entire sentence from scratch, using its previous prediction to build the target sentence.

Effect of Noise

Language models such as Neural Machine Translation (NMT) models have been shown to be very sensitive to noisy inputs (noise). Both natural noise (e.g., typographical errors or deviations, repetitions, rare words, non-alphanumeric symbols, non-standard capitalization, etc.) and synthetic noise (e.g., character swaps, etc.) can break conventional NMT models. Human readers, on the other hand, are very good at ignoring perturbations such as spelling mistakes, repetitions, and character swaps.

An approach to address the problem of noisy inputs is to train the NMT model on synthetic noisy text, e.g., noisy text generated from the training corpus while keeping the same reference. For example, let x,y be original source and target sentences, respectively, and $\hat{x},\hat{y}$ be corresponding synthetic noisy versions. The NMT model can then be trained on:

$$\min_\theta \mathcal{L}_{mt}(y, x; \theta) + \mathcal{L}_{mt}(\hat{y}, \hat{x}; \theta) \quad (2)$$

While such an approach can be effective on a set of perturbations that is easily generated, it generalizes poorly to new types of noise. For instance, known models trained on synthetic noisy text have performed poorly on text scraped from social media.

Generating noisy texts can be seen generally as a "black box" attack on a model. Correspondingly, training on synthetic noisy data can be considered a type of data augmentation that defends against these attacks.

Gradient-Based Adversarial Training

In adversarial training of natural language processing (NLP) models, an input to be noisified or perturbed is discrete, which complicates the problem of determining the best perturbation operation to attack the model. One technique for improving an adversarial framework for discrete inputs is to consider the token (e.g., word) embedding space as the input of the model, and find changes in words that maximize the change in loss. Some methods for adversarial training in NMT do so by using the gradient to guide a search in the discrete embedding space, e.g., by calculating an optimal (e.g., a single best) perturbation operation to attack the model.

Figure 3:
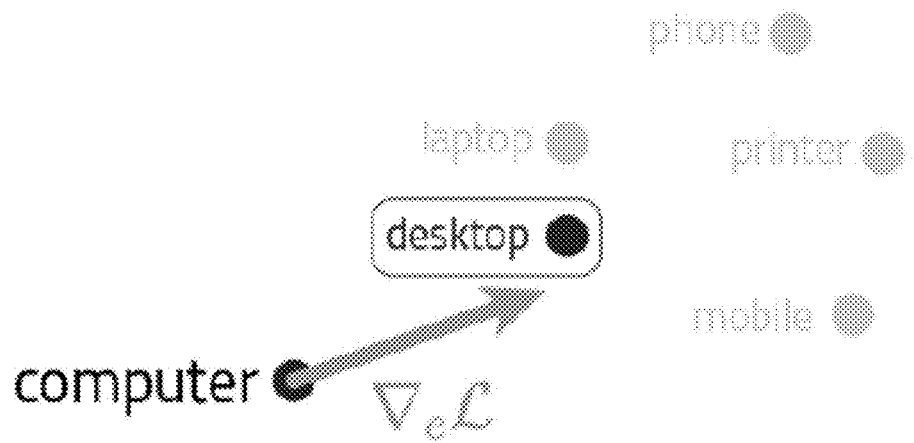
FIG. 3 shows an example token perturbation based on a loss gradient.

For example, if one wants to perturb the token (word) "computer" in the sequence "I want a computer", one can calculate the gradient of the loss with respect to the embedding of the word "computer". Then, a replacement can be found for it that is the most similar to the embedding of the word "computer" plus the gradient. For example, FIG. 3 shows an example gradient-based result where the word "desktop" is selected as the best candidate to perturb "computer" in the sentence "I want a computer" because it is the most similar to the perturbed embedding vector, e.g., as compared to candidates "laptop", "phone", "printer", and "mobile".

In an example gradient-based discrete adversarial training method, denote $\mathcal{L}$ to be the loss function, $\{x_1, \ldots, x_n\}$ the input sequence of words, $\{e_1, \ldots, e_n\}$ the corresponding embeddings where $e_i = e(x_i)$, and $\mathcal{V}$ the vocabulary. Denote $\nabla_{e_i}\mathcal{L}$ as the gradient with respect to the embedding $e_i$. $\mathcal{S}$ : $R^V \times R^V \to \mathcal{S}$ (x, y) is a similarity measure in the embedding space. The position $\tilde{\imath} \in \mathcal{T}$ with $\mathcal{T} = \|1,T\|$ and the word $\tilde{x}$ in the vocabulary $\mathcal{V}$ (or a subset $\mathcal{V}_{x_i} \subset \mathcal{V}$) can be chosen as follows:

$$\tilde{\imath}, \tilde{x} = \arg\max_{i, x \in \mathcal{T} \times \mathcal{V}_{x_i}} S(e(x) - e_i, \nabla_{e_i}\mathcal{L}) \quad (3)$$

where $\tilde{\imath}$ is the best position to change, and $\tilde{x}$ is the best word to replace to follow the gradient's direction.

The calculated similarity can be, for instance, as simple as a dot product $\mathcal{S}$ (x, y)=$x^T y$ or a cosine similarity $$S(x, y) = \frac{x^T y}{\|x\|\|y\|}.$$

The word, the most similar or colinear with the gradient's, is approximately the one with the largest increase in loss.

Pretrained Adversarial Generation Methods

Known methods for training language models using adversarial generation first pretrain an adversarial generator model, e.g., by fixing a language model (e.g., the language model to be trained) and then training the adversarial generator model to choose word substitutions. This pretrained adversarial generator model is then used to generate adversarial examples for training the language model by choosing word substitutions in a sentence.

Various methods can be used for choosing multiple word substitutions in a sentence. Example methods include one-shot (all substitutions are performed in parallel on the same clean loss, quickly generating adversarial examples); greedy (substitutions are calculated one after another, greedily maximizing the loss); and beam search (substitutions are calculated iteratively, maximizing the loss with a beam search). Example adversarial attack methods employing such techniques are known in the art.

For example, discrete white box (that is, having access to the model weights) adversarial methods based on gradients are disclosed in Ebrahimi et al., On Adversarial Examples for Character-Level Neural Machine Translation, In Proceedings of the 27$^{th}$ International Conference on Computational Linguistics, Sante Fe, N. Mex., pages 653-663. While the disclosed attacks using beam search were shown to perform well against black box methods, one-shot adversarially trained models did not significantly outperform the black box training.

Seq2Sick (M. Cheng et al., Seq2Sick: Evaluating the Robustness of Sequence-to-Sequence Models with Adversarial Examples, In Proceedings of the AAAI Conference on Artificial Intelligence, Vol. 34, pages 3601-3608, 2020) is a carefully crafted projected gradient attack on sequence-to-sequence models. However, 200 steps are used in the disclosed experiments, rendering the attack unusable for training robust models.

Michel et al., On Evaluation of Adversarial Perturbations for Sequence-to-Sequence Models, In Proceedings of the 2019 Conference of the North American Chapter of the Association for Computational Linguistics: Human Language Technologies, Vol. 1 (Long and Short Papers), Minneapolis, Minnesota, pages 3103-3114, discloses limiting perturbations to those that are more or less "meaning preserving." For example, example methods attempt to limit $\mathcal{V}_{x_i}$ (the set of possible word replacements) to the k nearest neighbors. A character swap (charswap) operation is also implemented for which the adversary can only choose the position. Similar to the methods disclosed in Ebrahimi et al. and M. Cheng et al., a greedy approach is used to generate multiple word substitutions. The greedily calculated attacks successfully attack the model.

Another example method for pretraining an adversarial generator disclosed in Y. Cheng et al., Towards Robust Neural Machine Translation, In Proceedings of the 56th Annual Meeting of the Association for Computational Linguistics (Volume I: Long Papers), Melbourne, Australian, 1756-1766, 2018; Cheng et al., Robust Neural Machine Translation with Doubly Adversarial Inputs, In ACL 2019-57th Annual Meeting of the Association for Computational Linguistics, Proceedings of the Conference, pages 4324-4333, 2019; and Cheng et al., AdvAug: Robust Adversarial Augmentation for Neural Machine Translation, In Proceedings of the 56$^{th}$ Annual Meeting of the Association for Computational Linguistics, pages 5961-5970, 2020 uses "doubly adversarial inputs" to improve the performance of NMT models.

An example doubly adversarial inputs method chooses a portion (e.g., 15%) of the tokens in the source sentence randomly. For each token $x_i$ in this set, the replacement $\tilde{x}_i$ is computed in $\mathcal{V}_{x_i} \subset \mathcal{V}$ $$\tilde{x}_i = \arg\max_{x \in \mathcal{V}_{x_i}} S(e(x) - e_i, \nabla_{e_i} \mathcal{L})$$

Meaning preserving words are chosen for replacement. To do so, the subset $\mathcal{V}_{x_i}$ is provided by the top n predictions of a bidirectional language model. It is a dynamic set that is specific for each word $x_i$. For instance, let $Q(x_i, x) \in \mathbb{R}^{|\mathcal{V}|}$ be the likelihood of the i-th word in the sentence x. $\mathcal{V}_{x_i}$=top_n $(Q(x_i,x))$ is then defined as the set of the n most probable words in terms of $Q(x_i,x)$. For the source language one gets:

$$Q_{src}(x_i,x) = P_{lm}(x|x_{<i}, x_{>i}; \theta_{lm}^x)$$

The perturbations are computed independently and therefore correspond to a one-shot attack for the encoder.

Once the total source sentence perturbation $\hat{x}$ is calculated, $\mathcal{L}(\hat{x},y)$ is computed and $\hat{y}$ is generated in a similar manner to $\tilde{x}$. The example method is thus doubly adversarial, since it attacks the translation model both on the source and the target side.

The final translation loss $\mathcal{L}(\hat{x},\hat{y})$ in the method disclosed in Y. Cheng et al. is the doubly adversarial loss augmented by the standard loss:

$$\min_\theta \mathcal{L}_{mt}(y, x; \theta) + \mathcal{L}_{mt}(\hat{y}, \hat{x}; \theta)$$

Direct Training of Adversarial Generators Using Backpropagation

In contrast to known methods, present example embodiments herein directly learn (train) an adversarial generator. Thus, as opposed to selecting substitute tokens (e.g., words or subwords) a posteriori using the gradient information, example methods disclosed herein provide an adversarial generator that can be directly trained using backpropagation with the goal of maximizing translation loss while also (e.g., during the same forward passes) training the language model for which the adversarial generator provides adversarial examples to improve robustness.

In some embodiment training methods, substitute tokens can be generated by an adversarial generator to be trained to replace tokens that are masked (e.g., randomly masked) from a source and/or target sequence. Such training methods are referred to herein as "masked adversarial generation" or (MAG) models.

Example training methods can use an adversarial generator based on an attention-based model, e.g., a self-attention model such as a transformer attention model, that learns a language model by masking (dropping) certain tokens and then predicting the masked tokens using the context (i.e., the tokens surrounding the masked token). A nonlimiting example attention-based model is Bidirectional Encoder Representations from Transformers (BERT) (e.g., as disclosed in Devlin et al., BERT: Pre-training of deep bidirectional transformers for language understanding, arXiv: 1810.04805, 2018).

Example training methods can preprocess the input token sequences (e.g., sequences of words) by splitting them into common tokens (e.g., words and/or subwords) across languages. An example preprocessing method can be similar to those used by masked language models (MLMs). An example MLM model can incorporate a byte-pair encoding (BPE) algorithm to preprocess the input token sequence.

Example training methods can concatenate the source and target sequences (e.g., sentences in first and second languages) together. An example method for concatenating the source and target sequences can be similar to that used for a cross-lingual language model (XLM model) such as the model disclosed in Lample and Conneau, Cross-Lingual language model pretraining, 2019, http://arxiv.org/abs/1901.07291. Such XLM models further enhance MLM-based models using dual language training.

Example methods and systems can provide many advantages. For instance, example models can be faster and simpler compared to using a pair of bidirectional models, such as in the methods proposed by Y. Cheng et al. By concatenating the source and target sequences the preprocessing task becomes multilingual. By masking random tokens at training times, the translation loss can be augmented with the data provided by the adversarial generator. Further, semantically-related substitutions (perturbations) for words in the concatenated source and target sentences can be sampled simultaneously, which can allow an example training method to take into account the source context for perturbing the target sentence and the target context for perturbing the source sentence.

Example methods will now be described more formally with respect to the following notations:
θ are the parameters of the example translation model to be trained, and are the parameters of a masked language generator model, embodied here as an XLM model.
x, y are source and target sentences.
$\tilde{x}, \tilde{y}$ are randomly masked source and target sentences.
$\hat{x}, \hat{y}$ are samples of predictions by XLM(φ).
Consider now the following model:

$$\hat{x}, \hat{y} \sim xlm[\tilde{x}\tilde{y}]$$

$$\min_\theta \mathcal{L}_{mt}(y, x; \theta) + \mathcal{L}_{mt}(\hat{y}, \hat{x}; \theta)$$

$$\min_\phi \mathcal{L}_{xlm}([\tilde{x}\tilde{y}]; \phi)$$

In the notations above, [xy] refers to the concatenation of source and target sentences.

The above example model is not adversarial, as the generator is only trained to perform a masked language modeling task. Augmentation is performed using an XLM model.

In example methods, the above model can be enhanced so that an example adversarial generator provides adversarial examples by also maximizing the translation loss. For example, suppose that one has a sample: $(\hat{y},\hat{x})$. If this sample is not adversarial enough, it would then be useful to correct the generator. To do so, example methods can backpropagate the translation gradients through the current discrete variables. In this way, the generator is trained while learning the translation models.

An example backpropagation method for backpropagating the translation gradients (i.e., backpropagating the translation loss across the discrete samples) uses the Gumbel-Softmax reparameterization method, e.g., as disclosed in Jang et al., Categorical Reparameterization with Gumbel-Softmax, 2016. The example distribution is a continuous probability distribution that approximates categorical samples. This allows the sampling of discrete tokens (e.g., words) by using a reparameterization technique to easily differentiate the sampling operation. Other optimization methods that may be used include, but are not limited to, the straight through estimator, such as disclosed at arxiv.org/abs/1903.05662.

The above model can thus be extended by using the Gumbel-Softmax reparameterization or other suitable backpropagation method (GumbelSoftmax is shown in the example method below):

$$\hat{x}, \hat{y} \sim GumbelSoftmax(xlm[\widetilde{xy}]) \quad (4)$$

$$\min_{\theta} \mathcal{L}_{mt}(y, x; \theta) + \mathcal{L}_{mt}(\hat{y}, \hat{x}; \theta)$$

$$\min_{\phi} \mathcal{L}_{xlm}([\widetilde{xy}]; \phi) - \gamma \mathcal{L}_{mt}(\hat{y}, \hat{x}; \theta) \quad (5)$$

In other words, combined loss (equation 5) calculated by the adversarial generator loss calculation block 236, which can then be used to optimize parameters of the adversarial generator 206, includes the modeling loss $\mathcal{L}_{xlm}([\widetilde{xy}])$ (i.e., the loss computed for substitution performance of the adversarial generator 206) and the adversarial loss $\mathcal{L}_{mt}(\hat{y},\hat{x})$ (i.e., the translation loss computed using noisy sequence pairs) (e.g., output at 234). A machine translation loss (or augmented loss, output at 240) (equation 4) calculated by the NMT loss calculation block 232, which can then be used to optimize parameters of the NMT model 204, is the standard translation loss $\mathcal{L}_{mt}(y,x)$ (i.e., the loss generated using the clean sequence pairs) augmented by the adversarial loss $\mathcal{L}_{mt}(\hat{y},\hat{x})$ (i.e., the loss generated using the noisy sequence pairs).

In the example model above, y is a tradeoff parameter between the adversarial loss and masked language (e.g., MLM) loss (a particular instance of the modeling loss). As an example, y can be set to one, or to a different number, e.g., between zero and (positive) infinity.

In example training methods, the adversarial generator aims to learn the masked language model (MLM) task, but also to generate data that would break the translation loss. In other words, a combined objective for the example adversarial generator is to produce substitutions that are very likely according to a language model (language model objective) yet would yield a poor translation (adversarial objective).

Example methods can optionally further enhance the encoder and decoder of the translation models to detect tokens that have been replaced with a discrimination loss. Example methods for determining a discrimination loss are disclosed in Clark et al., ELECTRA: Pre-Training Text Encoders as Discriminators Rather Than Generators, in International Conference on Learning Representations, 2019.

Discrimination loss can assess, for instance, how natural or unnatural the perturbations are. By incorporating discrimination loss, the above example model can be modified as shown below to provide an automatic data augmentation procedure when training the translation models.

$$\hat{x}, \hat{y} \sim GumbelSoftmax(xlm[\widetilde{xy}])$$

$$\min_{\theta} \mathcal{L}_{mt}(y, x; \theta) + \mathcal{L}_{mt}(\hat{y}, \hat{x}; \theta) + \mathcal{L}_{discr}(\hat{y}, \hat{x})$$

$$\min_{\phi} \mathcal{L}_{xlm}([\widetilde{xy}]; \phi) - \gamma \mathcal{L}_{mt}(\hat{y}, \hat{x}; \theta)$$

In the above modified model, $\mathcal{L}_{discr}$ is the discrimination loss, which is employed for training the translation layer. The discrimination loss can be applied to a discrimination head provided at the end of the encoder and the end of the decoder. This discrimination head can be, for instance, a softmax layer or other prediction layer or layers (e.g., multiple linear layers (MLP)) that predicts whether the token at the corresponding position is real or generated. An example discriminator head, such as heads 244, 246 in FIG. 2, can be incorporated generally similarly to that in the ELECTRA language model architecture, as disclosed in Clark et al.

Example methods herein can be made much less computationally taxing compared to existing training methods. For instance, in example methods only a single forward and backward pass may be needed or used during training. By contrast, other methods may use two bidirectional language models that are roughly the same size as the translation model, and perform two forward and backward passes. As a result, such methods may be significantly slower than a normal transformer.

Figure 4:
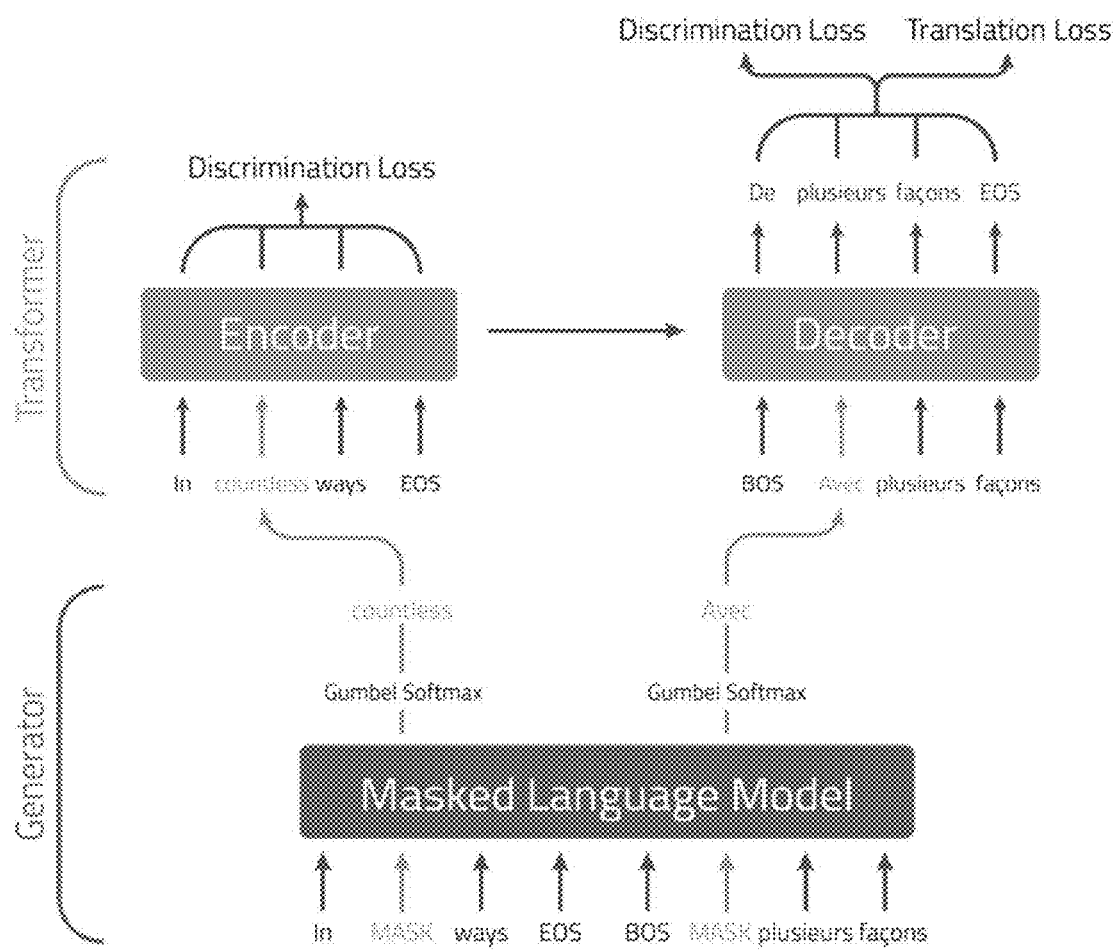
FIG. 4 shows an example operation of a training method using a masked language model for adversarial generation and a transformer model for a neural language model.

FIG. 4 shows an example operation of a model architecture for training a neural machine translation (NMT) model as described above. The example architecture, which may be embodied by the processor 202 in FIG. 2, for instance, includes an adversarial generator employing a Masked Language Model (MLM), e.g., an XLM model, having model parameters φ. The adversarial generator is in communication with a translation model having model parameters θ. The example translation model employs a transformer architecture and includes an encoder layer and a decoder layer.

The encoder layer, which is embodied in a parametric function such as the encoder $f_\theta$ described above, receives a noisy source sentence generated by the adversarial generator having a substituted token (e.g., word) in place of a masked token in the clean source sentence.

The encoder outputs a dense vector representation (e.g., representation Y). The decoder layer, which is embodied in a parametric function such as the decoder $g_\theta$ described above, receives the dense vector representation as well as a noisy target sentence having a substituted token (e.g., word) generated by the adversarial generator layer in place of a randomly masked token in a clean target sentence (a reference sentence). The clean source and target sentences can be provided, for instance, from an available dataset, nonlimiting examples of which include IWSLT 16 and WMT 17.

For instance, in the example training operation of the architecture 200 shown in FIG. 2, an input source sequence to the adversarial generator layer includes a clean source sequence x including tokens "In", "many", "ways", and [EOS] (i.e., End Of Sequence), and an input clean target sequence y includes tokens [BOS] (i.e., Beginning Of Sequence), "De", "plusieurs", and "façons". During training, the source and target sequences are concatenated together ([xy]), e.g., to provide a multilingual input.

The adversarial generation layer masks (shown as [MASK]), e.g., drops, one or more tokens in the concatenated source and/or target sentences, e.g., token "many" from the input source portion and token "De" from the input target portion. This provides a concatenated masked sequence ($[\tilde{xy}]$) of randomly masked source and target sequences $\tilde{x}$ ("In", [MASK], "ways", [EOS]) and $\tilde{y}$ ([BOS], [MASK], "plusieurs", "façons"). This concatenated masked sequence is input into the MLM model. The selection of token(s) to mask in the source and/or target sentences can be made according to any of various methods, such as but not limited to random selection, span masking, masking based on word frequency, or others.

To generate adversarial examples (synthetic noisy sequences), the masked language model (MLM) perturbs the concatenated masked sequence $[\tilde{xy}]$ by generating samples of predictions $\hat{x}$, $\hat{y}$ from the concatenated masked sequence. In the example operation, a continuous probability distribution that approximates categorical samples and allows for backpropagation, such as the Gumbel-Softmax reparameterization, is employed to generate the predictions by sampling discrete tokens (e.g., words). As a result, in the example operation in FIG. 4, the perturbation token "countless" is generated to replace the masked token "many" in the source portion of the concatenated sequence, and the perturbation token "Avec" is generated to replace the masked token "De" in the target portion of the concatenated sequence.

The generated noisy source and target sequences $\hat{x}$, $\hat{y}$ from the concatenated noisified sequence, which include the clean source and target sequences having the perturbation tokens substituted for the randomly masked tokens, are input into the encoder and the decoder, respectively. In the example operation shown in FIG. 4, the noisy source sentence fed to the encoder layer of the translation layer includes tokens "In", "countless", "ways", [EOS], and the noisy target sentence fed to the decoder layer includes tokens [BOS], "Avec", "plusieurs", "façons".

The encoder in the example operation receives the noisy source sentence and outputs the dense vector representation to the decoder. The decoder, receiving the dense vector representation and the noisy target sentence (for training using teacher forcing) and modeling the conditional probability of the output tokens, generates the output sequence "De", "plusieurs", "façons", [EOS].

Additionally, for determining the standard translation loss, the clean source and target sequences x,y from the concatenated clean source and target sequences are input into the encoder and the decoder, respectively. For example, the encoder is fed the token sequence "In", "many", "ways", and [EOS], and the decoder is fed (during teacher forcing) the token sequence [BOS], "De", "plusieurs", and "façons".

An augmented translation loss $\mathcal{L}_{mt}(y, x; \theta) + \mathcal{L}_{mt}(\hat{x}, \hat{y}; \theta)$ is determined (e.g., computed) by a calculation layer which may be incorporated into the translation layer or a separate layer, such as shown in FIG. 2. The calculated augmented translation loss includes an adversarial loss $\mathcal{L}_{mt}(\hat{y}, \hat{x}; \theta)$ augmenting the standard translation loss $\mathcal{L}_{mt}(y,x; \theta)$.

Additionally, in the example method shown in FIG. 4, a discriminator including a discrimination head, e.g., a softmax or other prediction layer, at the end of the encoder and/or the end of the decoder determines (e.g., computes) a discrimination loss $L_{discr}(\hat{y}, \hat{x})$ by predicting whether the token in the corresponding position is real or generated.

A generator loss, e.g., masked language model loss $\mathcal{L}_{xlm}([\tilde{xy}]; \phi)$, is determined (e.g., computed), such as by computing the softmax cross entropy loss between the predicted tokens and the groundtruth tokens. An adversarial generator loss for training the adversarial generator is then determined (e.g., computed) by combining the generator (here, XLM) loss and the adversarial loss, weighted by the offset parameter $\gamma \mathcal{L}_{mt}(\hat{y}, \hat{x}; \theta)$.

Gradients are generated from the determined augmented translation loss, as may be further augmented by the determined discrimination loss, for optimizing the parameters $\theta$ of the translation model. Further, gradients generated from the generator loss and the adversarial loss, as weighted by any tradeoff parameter, are used to optimize the parameters $\phi$ of the adversarial generator (e.g., the masked language model) through backpropagation.

Network Architecture

Figure 5:
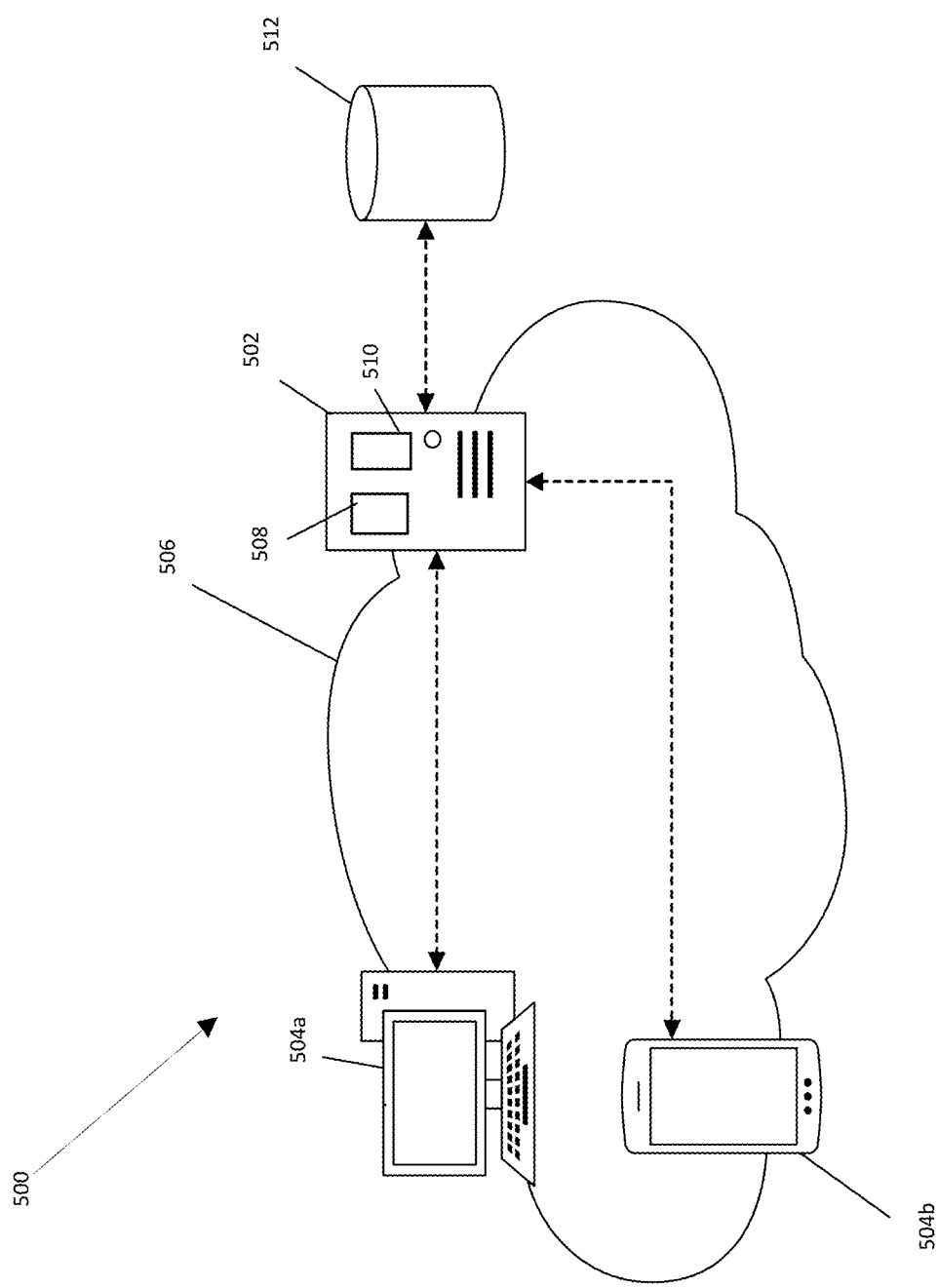
FIG. 5 shows an example network architecture in which example methods can be performed.

Example systems, methods, and embodiments may be implemented within a network architecture 500 such as the architecture illustrated in FIG. 5, which comprises a server 502 and one or more client devices 504a, 504b that communicate over a network 506 which may be wireless and/or wired, such as the Internet, for data exchange. The server 502 and the client devices 504a, 504b can each include a processor, e.g., processor 508 and a memory, e.g., memory 510 (shown by example in server 502), such as but not limited to random-access memory (RAM), read-only memory (ROM), hard disks, solid state disks, or other non-volatile storage media. Memory 510 may also be provided in whole or in part by external storage in communication with the processor 508.

The processor 202 in FIG. 2, for instance, may be embodied in the processor 508 or other processor in the server 502 and/or client devices 504a, 504b. It will be appreciated that the processor 508 can include either a single processor or multiple processors operating in series or in parallel, and that the memory 510 can include one or more memories, including combinations of memory types and/or locations. Server 500 may also include, but are not limited to, dedicated servers, cloud-based servers, or a combination (e.g., shared). The storage, e.g., database 220, in FIG. 2 may be embodied in suitable storage in the server 502, client device 504, a connected remote storage 512 (shown in connection with the server 502, but can likewise be connected to client devices), or any combination.

Client devices 504a, 504b may be any processor-based device, terminal, etc., and/or may be embodied in a client application executable by a processor-based device, etc. Client devices may be disposed within the server 502 and/or external to the server (local or remote, or any combination) and in communication with the server. Example client devices 504 include, but are not limited to, desktop or personal computers 504a, mobile communication devices (e.g., smartphones, tablet computers, etc.) 504b, autonomous devices, wearable devices, virtual reality, augmented reality, or mixed reality devices (not shown), or others. Client devices 504 may be configured for sending data to and/or receiving data from the server 502. Client devices 504 or servers 202 may include, but need not include, one or more output devices, such as but not limited to displays, printers, transmitters, etc. for displaying, printing, or transmitting results of certain methods that are provided for display by the server. Client devices may include combinations of client devices.

In an example training method the server 502 or client devices 504 may receive sequence pairs from any suitable source, e.g., from memory 510 (as nonlimiting examples, internal storage, an internal database, etc.), from external (e.g., remote) storage 512 connected locally or over the network 506. The example training method can generate a trained model that can be likewise stored in the server 502 (e.g., memory 510), client devices 504, external storage 512, or a combination. In some example embodiments provided herein, training and/or inference may be performed offline or online (e.g., at run time), in any combination. Results can be output (e.g., displayed, transmitted, provided for display, printed, etc.) and/or stored for retrieving and providing on request.

Generally, embodiments can be implemented as computer program products with a program code or computer-executable instructions, the program code or computer-executable instructions being operative for performing one of the methods when the computer program product runs on a computer. The program code or the computer-executable instructions may, for example, be stored on a computer-readable storage medium.

In an embodiment, a storage medium (or a data carrier, or a computer-readable medium) comprises, stored thereon, the computer program or the computer-executable instructions for performing one of the methods described herein when it is performed by a processor.

Embodiments described herein may be implemented in hardware or in software. The implementation can be performed using a non-transitory storage medium such as a computer-readable storage medium, for example a floppy disc, a DVD, a Blu-Ray, a CD, a ROM, a PROM, and EPROM, an EEPROM or a FLASH memory. Such computer-readable media can be any available media that can be accessed by a general-purpose or special-purpose computer system.

Inference Method

Figure 6:
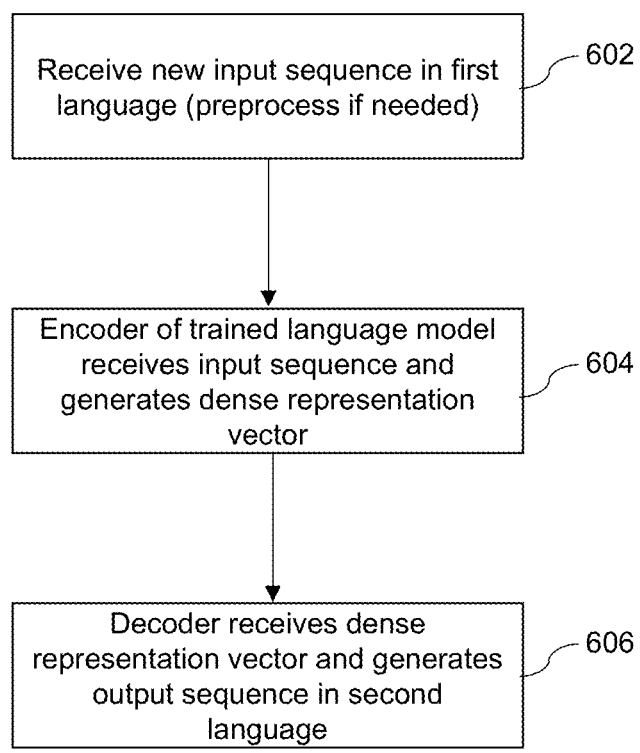
FIG. 6 shows an example inference method using a trained neural language model.

FIG. 6 shows an example inference method 600 using a neural language model, such as a transformer model trained using method 100, an example being the NMT model 204. The example method 600 can be performed using a processor such as processor 202 in FIG. 2, which can be incorporated into devices such as server 502 and/or client devices 504, or a combination (e.g., if operation is shared). The neural language model can be, for instance, a bilingual translation model. When the trained neural language model 204 is used for inference at runtime, features that may be provided for training the neural model such as the adversarial generator 206, loss calculator 212, and the (optional) discriminator 208 need not be used and can be omitted.

A new input sequence in a first language is received by the trained neural language model at 602. The input sequence can be preprocessed using methods known to those of ordinary skill in the art. An encoder, such as encoder 214, receives the input sequence at 604 and generates a dense representation vector. A decoder, such as decoder 216, receives the dense representation vector and generates the output sequence in a second language at 606.

Experiments

An example model using masked adversarial generation (MAG model) was evaluated in comparison with a reimplementation of the prior doubly adversarial model on two datasets: WMT-17 English to German, and IWSLT 16 German to English (de-en). IWSLT-16 is a relatively small dataset containing 0.2M parallel sentences. By comparison, the WMT-17 en-de dataset is much larger, 4.5M parallel sentences.

In all implemented models in the WMT 17 experiments, the translation model (Transformer) had the same hyperparameters as in the Transformer-base architecture disclosed in Vaswani et al., Attention is all you need, in Advances in Neural Information Processing Systems 30, pages 5998-6008, 2017. The learning rate schedule, decoding hyperparameters, and batch size were also the same.

In the example MAG model, the adversarial generator was twice smaller than the translation model, in that the adversarial generator had the same number of layers, but the hidden size was halved. In the doubly adversarial inputs, the bidirectional language models were in total twice the size of the original Transformer, which made the training much slower in comparison. The Gumbel Softmax layer had a temperature of 1; the tradeoff parameter $\gamma$ was set to 1.

The IWSLT experiments had similar hyperparameters, except that the hidden size of the Transformer was set to 512. The fully connected layer had a hidden size of 1024. The adversarial generator was also half the size of the transformer's hidden size. The learning rate was adapted to the hidden size as specified in Vaswani et al. For all results, the model was selected by its best checkpoint according to the validation metrics.

To measure robustness of the NMT models, an unknown character was added at the beginning of the sentence UNK.S and at the end UNK.E. This rare character may perturb the model, as disclosed in Clinchant et al., On the Use of BERT for Neural Machine Translation, In Proceedings of the $3^{rd}$ Workshop on Neural Generation and Translation, Association for Computational Linguistics, Hong Kong, pages 108-117, 2019. In addition, the source sentence was perturbed by replacing a small proportion p of words by the best candidate given by an xlm-roberta language model trained on a very large corpus. The original words were excluded from the candidates, thus replacing exactly the proportion p of words.

Once the perturbation was defined, the robustness was defined as a measure of a change in performance. Let $P(target_1, target_2)$ be an evaluation metric measuring the similarity between $target_1$ and $target_2$ (e.g., as measured by BLEU, chRF, etc.). M(source) is the model's output given the source. The following robustness measures were considered:

$\Delta$ (chrf): chrf (M(perturbed),reference)−chrf (M(original), reference), as disclosed in Clinchant et al. The measure is negative and the closer to zero the better the robustness.

$$Rob(P) = \frac{P(M(\text{perturbed}), \text{reference})}{P(M(\text{original}), \text{reference})}$$

This measures the proportion of performance that is retained after perturbation. Further details of this metric are disclosed in Niu et al., Evaluating Robustness to Input Perturbations for Neural Machine Translation, In Proceedings of the $58^{th}$ Annual Meeting of the Association for Computational Linguistics, pages 8538-8544, 2020.

Cons(P)=P (perturbed), (M (original))): This measures consistency of the model, showing how much the translation changed without needing a reference sentence. The higher the measure, the better. Further details of this metric are disclosed in Niu et al.

Results

Table 1, below, shows example validation BLEU scores obtained after training on IWSLT-14 de-en, as well as robustness measures on the IWSLT-14 de-en perturbed validation dataset. The results show a significant improvement over the Transformer baseline for both the example MAG model and the doubly adversarial model on IWSLT-14 de-en.

All tested methods improved the robustness of the base Transformer model. However, the example MAG model was much faster to train than the doubly adversarial model. The training times on a normal transformer model on IWSLT-14 were around 3 hours on a single V100 GPU. For the doubly adversarial inputs, training time for an experiment on a V100 GPU on IWSLT-14 was 14 hours long. For the example MAG model experiment, the training time for IWSLT-14 was 5 hours long.

TABLE 1

| Model | BLEU | Rob(BLEU) p = | | | Cons(BLEU) | | |
|---|---|---|---|---|---|---|---|
| | | 0.05 | 0.1 | 0.15 | 0.05 | 0.1 | 0.15 |
| Transformer | 33.5 | 86.6 | 75.0 | 65.2 | 69.3 | 53.6 | 43.4 |
| Random perturbation Training | 34.0? | 87.9 | 78.3 | 69.7 | 73.2 | 59.1 | 49.0 |
| Doubly adversarial | 34.9 | 88.3 | 78.0 | 69.0 | 74.2 | 59.6 | 50.2 |
| MAG (ours) | 35.0 | 88.5 | 79.1 | 70.5 | 73.9 | 60.1 | 50.9 |

For the WMT experiments, the example MAG model was first compared to the normal Transformer and to a transformer with a larger batch size, as such adversarial training amounts to using a larger batch where tokens have been replaced. A random substitution attack was also added. Further, the performance of the MAG model was shown where the generation is not adversarial (i.e., $\gamma=0$), (MAG-NoAdv), as well as a model (MAG-NoMLM) where the generator is purely adversarial (no MLM loss is taken into account). Experiments were also run with byte pair encoding (BPE) sizes of 32K and 40K.

Table 2, below, compares the results of the MAG model with different baselines on the WMT14 test set, as well as its robustness for the XLM augmentation and the unknown character augmentation. The results showed that the model BLEUs were mostly on par with the baseline. Further, the random baseline improved robustness for XLM augmentation and UNK.E but not for the UNK.S. The metrics $\Delta$(chrf) and cons(chrf) agreed on the ranking between models for XLM and UNK.S but not for UNK.E.

While the results for MAG-NoAdv and MAG-NoMLM demonstrated that both pseudo data augmentation and adversarial training are beneficial, the example MAG method overall improved robustness.

Table 3, below, shows domain robustness results for the models (trained on WMT17 data) on an out-of-domain test set. The WMT20 Robust test set included many noisy sentences, including Medline is from the Medical domains, and two news test sets. For this out-of-domain test set, MAG performed the best in the experiments.

TABLE 3

| Model | WMT20 Robust | Medline188 | News20 | News18 |
|---|---|---|---|---|
| Transformer 32k | 19.4 | 14.5 | 22.4 | 39.6 |
| Transformer 32k BatchX2 | 19.1 | 14.3 | 22.2 | 39.8 |
| Transformer 40k BatchX2 | 19.4 | 14.8 | 22.8 | 39.3 |
| Random 40k | 19.0 | 14.8 | 23.1 | 40.1 |
| MAG 32k | 19.8 | 15.0 | 23.1 | 40.3 |
| MAG 40k | 19.9 | 14.6 | 23.8 | 40.4 |

General

The foregoing description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure may be implemented in and/or combined with features of any of the other embodiments, even if that combination is not explicitly described. In other words, the described embodiments are not mutually exclusive, and permutations of one or more embodiments with one another remain within the scope of this disclosure.

TABLE 2

| Model | BLEU | XLM p = 0.1 | | UNK.S | | UNK.E | |
|---|---|---|---|---|---|---|---|
| | | $\Delta$(chrf) | Cons(chrf) | $\Delta$(chrf) | Cons(chrf) | $\Delta$(chrf) | Cons(chrf) |
| Transformer 32k | 26.1 | −0.081 | 68.0 | −0.0099 | 87.2 | −0.010 | 86.3 |
| Transformer 32k BatchX2 | 26.7 | −0.082 | 68.0 | −0.0013 | 83.2 | −0.009 | 86.1 |
| MAG 32k | 26.8 | −0.071 | 71.3 | −0.0095 | 87.8 | −0.006 | 89.0 |
| Random 32k | 26.4 | −0.076 | 69.7 | −0.013 | 85.0 | −6.5e−3 | 90.3 |
| MAG-NoAdv | 26.9 | −0.08 | 68.9 | −0.015 | 85.0 | −0.007 | 91.7 |
| MAG-NoMLM | 26.8 | −0.08. | 69.2 | −0.012 | 86.3 | −0.013 | 87.6 |
| Transformer 40k | 26.4 | −0.081. | 68.4 | −0.010 | 86.4 | −0.010 | 85.6 |
| Transformer 40k BatchX2 | | | | | | | |
| MAG 40k | 26.7 | −0.069 | 71.5 | −0.006 | 88.8 | −0.004 | 88.8 |
| Random 40k | 26.7 | −0.077 | 69.7 | −0.012 | 85 | −0.005 | 90.5 |
| MAG-NoAdv | 26.6 | −0.078 | 69.7 | −0.012 | 86.3 | −0.008 | 88.9 |
| MAG-NoMLM | 26.8 | −0.078 | 68.9 | −0.012 | 85.6 | −0.015 | 85.6 |

Each module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module. Each module may be implemented using code. The term code, as used above, may include software, firmware, and/or microcode, and may refer to programs, routines, functions, classes, data structures, and/or objects.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The systems and methods described in this application may be partially or fully implemented by a special purpose computer created by configuring a general purpose computer to execute one or more particular functions embodied in computer programs. The functional blocks, flowchart components, and other elements described above serve as software specifications, which may be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

The invention claimed is:

1. A method for training a neural language model, the method being implemented by a processor and memory, the method comprising:
   receiving a plurality of clean sequence pairs, each clean sequence pair including a clean source sequence and a clean target sequence, the plurality of clean sequence pairs providing a clean parallel corpus; and
   training an adversarial generator to generate a noisified parallel corpus from the clean parallel corpus while training the neural language model using both the noisified parallel corpus and the clean parallel corpus to improve robustness of the neural language model;
   wherein said training the adversarial generator comprises:
      (i) for each clean sequence pair, generating a noisy version with the adversarial generator to generate a noisy sequence pair, the adversarial generator being a differentiable model definable by a plurality of parameters;
      (ii) determining a modeling loss of the adversarial generator using at least the generated noisy sequence pairs; and
      (iii) optimizing the parameters of the adversarial generator based on at least the determined modeling loss;
   wherein said training the neural language model using both the noisified parallel corpus and the clean parallel corpus comprises:
      (i) inputting the clean sequence pairs and the noisy sequence pairs to the neural language model, wherein the neural language model generates output sequences from the clean sequence pairs and from the noisy sequence pairs;
      (ii) determining a neural language model loss using the generated output sequences from the clean sequence pairs and from the noisy sequence pairs; and
      (iii) optimizing parameters of the neural language model based on the determined neural language loss.

2. The method of claim 1, wherein the neural language model comprises a machine translation model; and
   wherein said optimizing the parameters of the adversarial generator is based on objectives comprising minimizing the modeling loss of the adversarial generator and maximizing a neural language model loss of the neural language model using backpropagation.

3. The method of claim 2, wherein the machine translation model is bilingual.

4. The method of claim 2, wherein the clean sequence pairs comprise clean sentence pairs, the noisy sequence pairs comprise noisy sentence pairs, the plurality of clean sentence pairs is received from a machine translation dataset, the clean source sequence comprises a clean source sentence in a first language, and the clean target sequence comprises a clean target sentence in a second language.

5. The method of claim 4, wherein the machine translation model comprises an encoder and a decoder.

6. The method of claim 5, wherein the machine translation model comprises a transformer model.

7. The method of claim 5,
   wherein training the neural language model improves robustness of the machine translation model to token substitutions,
   wherein the adversarial generator is trained to generate token substitutions for tokens in the clean sentence pair that are linguistically plausible according to a language model objective, and that are detrimental to the machine translation model according to an adversarial objective, and
   wherein the tokens comprise words and/or subwords.

8. The method of claim 7, wherein the adversarial generator is further trained based on an offset weighting the language model objective and/or the adversarial objective.

9. The method of claim 5,
wherein said generating a noisy version comprises sampling;
wherein the method further comprises:
concatenating each clean sequence pair before said sampling.

10. The method of claim 9, wherein the adversarial generator further comprises a differentiable model using a continuous probability distribution that approximates categorical samples.

11. The method of claim 9, wherein the differential model comprises a Gumbel-softmax reparametrization model.

12. The method of claim 5, further comprising:
inputting a source sentence from the noisy sentence pair to the encoder and inputting a target sentence from the noisy sentence pair to the decoder;
the encoder outputting a dense vector representation; and
the decoder receiving the dense vector representation.

13. The method of claim 1, further comprising:
further optimizing parameters of the neural language model using a discriminator objective of a discriminator configured to distinguish between clean and substituted tokens in the noisy sequence pairs.

14. The method of claim 13,
wherein the neural language model comprises an encoder and a decoder; and
wherein the discriminator is provided at an end of the encoder and/or at an end of the decoder.

15. The method of claim 9, further comprising preprocessing the plurality of clean sequence pairs, wherein the preprocessing comprises:
splitting the clean sequence pairs into tokens, the tokens comprising words and/or subwords;
randomly masking one or more of the tokens in the clean source sentence and/or the clean target sentence;
wherein said sampling a noisy version of the clean sentence pair perturbates the masked tokens.

16. The method of claim 15, wherein said sampling a noisy version replaces the masked tokens with an objective of preserving meaning of the masked token.

17. The method of claim 16, wherein said preprocessing and said sampling take place during embedding of tokens in the clean sequence pairs.

18. A method for generating an output sequence from an input sequence, the method comprising:
receiving the input sequence;
processing the input sequence with the neural language model trained using the method of claim 1, wherein the trained neural language model generates the output sequence; and
transmitting the output sequence.

19. The method of claim 18, wherein the neural language model comprises a bilingual machine translation model, the bilingual machine translation model comprising:
an encoder for receiving the input sequence and generating a dense vector representation; and
a decoder for receiving the dense vector representation and generating the output sequence;
wherein the input sequence is in a first language and the output sequence is in a second language.

20. A system for training a machine translation model, the system being implemented by a processor and a memory, the system comprising:
a machine translation model; and
a multilingual language model generator that is trained to generate token substitutions in clean sentence pairs of source and target sentences in a machine translation batch to provide noisy sentence pairs, the tokens comprising words and/or subwords, the token substitutions comprising insertions and deletions, the token substitutions being linguistically plausible based on a first objective and detrimental to the machine translation model based on a second objective, the multilingual language model generator being differentiable;
wherein the multilingual language model generator is trained to generate a noisified parallel corpus of a clean parallel corpus while the machine translation model is trained to improve robustness of the machine translation model to token substitutions by:
for each clean sentence pair in the clean parallel corpus, sampling a noisy version with the multilingual language model generator;
inputting the clean sentence pairs and their noisy version to the machine translation model;
optimizing machine translation parameters both on the clean sentence pairs and on their noisy version, wherein the machine translation model generates output sequences from the clean sentence pairs and from their noisy version, and said optimizing parameters is based on machine translation losses determined for the generated output sequences; and
optimizing parameters of the multilingual language model generator using backpropagation to minimize the language modeling loss based on the first objective and maximize the machine translation loss based on the second objective.

21. The system of claim 20, wherein the machine translation model comprises a transformer model including an encoder and a decoder.

22. The system of claim 21, further comprising:
a preprocessor configured to:
receive the clean sentence pairs;
split the clean sentence pairs into common tokens, the tokens comprising words and/or subwords, and
mask random tokens in the clean sentence pairs;
wherein the generated substitutions replace the masked random tokens.

23. The system of claim 22, wherein a discriminator is provided at an end of the encoder and at an end of the decoder.

24. The system of claim 23, wherein the noisy sentence pair comprises a noisy source sentence and/or a noisy target sentence;
wherein said optimizing machine translation parameters both on the clean sentence pairs and on their noisy version comprises:
inputting the noisy source sentence and/or the clean source sentence to the encoder, the encoder generating a vector representation and outputting the vector representation to the decoder;
inputting the noisy target sentence and/or the clean target sentence to the decoder, the decoder modeling a conditional probability of output tokens and generating the output sequence;
determining a translation loss from the generated output sequence of the decoder; and
optimizing the machine translation parameters based on the determined translation loss.

25. The system of claim 20, further comprising:
a discriminator for distinguishing between clean and substituted tokens in the noisy sequence pairs;
wherein the multilingual language model generator is further configured to further optimize machine translation parameters on a discriminator objective of the discriminator.

26. A method for training a neural machine translation model, the method being implemented by a processor and memory, the method comprising:
noisifying, using an adversarial generator, at least one of a source side and a target side of a clean parallel corpus to provide a noisified parallel corpus, wherein the source side and the target side of the clean parallel corpus comprises clean sentence pairs including a clean source sentence and a clean target sentence, respectively, and wherein the adversarial generator generates noisy sentence pairs in the noisified parallel corpus including a noisy source sentence and a noisy target sentence;
training the neural machine translation model using both the noisified parallel corpus and the clean parallel corpus to improve robustness of the machine translation model to word substitutions; and
training the adversarial generator to generate the noisified parallel corpus;
wherein said training the machine translation model and said training the adversarial generator use backpropagation and take place in a same forward pass and backward pass;
wherein said training the neural machine translation model comprises:
inputting the clean sentence pairs and the noisy sentence pairs to the machine translation model; and
optimizing machine translation parameters both on the clean sentence pairs and on the noisy sentence pairs, wherein the machine translation model generates output sequences from the clean sentence pairs and from the noisy sentence pairs, and said optimizing parameters is based on machine translation losses determined for the generated output sequences.

27. The method of claim 26,
wherein, in the generated noisy source sentence and the generated noisy target sentence, random subwords have been replaced by candidate words, the candidate words being both linguistically plausible and likely to be detrimental to the neural machine translation model.

28. A method for training a neural machine translation model, the method being implemented by a processor and memory, the method comprising:
noisifying, using an adversarial generator, at least one of a source side and a target side of a clean parallel corpus to provide a noisified parallel corpus;
training the neural machine translation model using both the noisified parallel corpus and the clean corpus to improve robustness of the machine translation model to word substitutions; and
training the adversarial generator to generate the noisified parallel corpus;
wherein said training the machine translation model and said training the adversarial generator use backpropagation and take place in a same forward pass and backward pass;
wherein said neural machine translation model comprises an encoder and a decoder;
wherein said noisifying comprises the adversarial generator generating, during the forward pass, a noisy sentence pair in the noisified parallel corpus including a noisy source sentence and a noisy target sentence in which random subwords have been replaced by candidate words;
wherein the noisy source sentence is fed to the encoder and the noisy target sentence is fed to the decoder during the forward pass;
wherein the encoder generates a dense vector representation from the noisy target sentence and feeds the dense vector representation to the decoder during the forward pass; and
wherein the decoder generates an output sequence during the forward pass.

29. The method of claim 28, wherein said training the neural machine translation model comprises, during the backward pass:
optimizing parameters of the neural machine translation model on the clean sentence pair and on the noisy sentence pair using backpropagation; and
further optimizing parameters of the neural language model using a discriminator objective of a discriminator configured to distinguish between real and fake examples using backpropagation.

30. The method of claim 29, wherein said training the adversarial generation comprises, during the backward pass:
optimizing parameters of the adversarial generator to minimize a modeling loss of the adversarial generator and maximize the translation loss using backpropagation.

31. An apparatus for training a neural language model comprising:
a non-transitory computer-readable medium having executable instructions stored thereon for causing a processor and a memory to:
receive a plurality of clean sequence pairs, each clean sequence pair including a clean source sequence and a clean target sequence, the plurality of clean sequence pairs providing a clean parallel corpus; and
training an adversarial generator to generate a noisified parallel corpus from the clean parallel corpus while training the neural language model using both the noisified parallel corpus and the clean parallel corpus to improve robustness of the neural language model;
wherein said training the adversarial generator comprises:
(i) for each clean sequence pair, generating a noisy version with the adversarial generator to generate a noisy sequence pair, the adversarial generator being a differentiable model definable by a plurality of parameters;
(ii) determining a modeling loss of the adversarial generator using at least the generated noisy sequence pairs; and
(iii) optimizing the parameters of the adversarial generator based on at least the determined modeling loss;
wherein said training the neural language model using both the noisified parallel corpus and the clean parallel corpus comprises:
(i) inputting the clean sequence pairs and the noisy sequence pairs to the neural language model, wherein the neural language model generates output sequences from the clean sequence pairs and from the noisy sequence pairs;
(ii) determining a neural language model loss using the generated output sequences from the clean sequence pairs and from the noisy sequence pairs; and iii) optimizing parameters of the neural language model based on the determined neural language loss.

* * * * *